United States Patent
Ahn et al.

[11] Patent Number: 5,997,743
[45] Date of Patent: Dec. 7, 1999

[54] WATER TREATMENT METHOD USING HOLLOW FIBER MEMBRANE AND APPARATUS THEREFOR

[76] Inventors: Kyu-Hong Ahn, 56-407, Hanyang Apt. San 5-1, Apkulung-dong, Kangnam-gu, Seoul; Hyung-Soo Kim, 637-75 Hangshin-dong, Koyang-city, Kyungki-do; Kyung-Guen Song, 2-1301 Hanyang Apt. Pukkajwa 1-dong, Seodaemun-gu, Seoul, all of Rep. of Korea

[21] Appl. No.: 08/777,053

[22] Filed: Dec. 30, 1996

[51] Int. Cl.⁶ ............................ B01D 61/00; B01D 63/00
[52] U.S. Cl. .................... 210/650; 210/636; 210/321.69
[58] Field of Search .................... 210/636, 650, 210/321.69, 791, 195.2, 257.2

[56] References Cited

U.S. PATENT DOCUMENTS

| | | |
|---|---|---|
| 3,541,004 | 11/1970 | Cooper et al. ............................ 210/636 |
| 3,617,553 | 11/1971 | Westaway et al. ...................... 210/651 |
| 3,663,400 | 5/1972 | Christenson et al. ................... 204/181 |
| 4,780,210 | 10/1988 | Hsia ......................................... 210/638 |
| 5,248,424 | 9/1993 | Cote et al. .......................... 210/321.69 |
| 5,403,479 | 4/1995 | Smith et al. ............................. 210/636 |
| 5,451,317 | 9/1995 | Ishida et al. .......................... 210/416.1 |
| 5,643,455 | 7/1997 | Kopp et al. ............................. 210/636 |

*Primary Examiner*—Ana Fortuna
*Attorney, Agent, or Firm*—Stevens, Davis, Miller & Mosher, L.L.P.

[57] ABSTRACT

A water treatment method using a hollow fiber membrane and an apparatus therefor are provided, and particularly, a direct-suction filtration method is used to enhance the water treatment efficiency, and the pollutants attached to the hollow fiber membrane are removed by a direction-convertible stirrer placed in the water tank containing the hollow fiber membrane to thereby extend the life of the membrane.

7 Claims, 1 Drawing Sheet

WATER TREATMENT METHOD USING HOLLOW FIBER MEMBRANE AND APPARATUS THEREFOR

BACKGROUND OF THE INVENTION

The present invention relates to a water treatment method using a hollow fiber membrane and an apparatus therefor, and particularly, to a direct-suction type water treatment method using a hollow fiber membrane and an apparatus therefor, in which a direct-suction filtration method is used to enhance the water treatment efficiency, and pollutants attached to the hollow fiber membrane are removed by a direction-convertible stirrer in a water tank containing the hollow fiber membrane to thereby extend the life of the membrane.

A hollow fiber membrane is of a thread from which has a hole in the middle thereof as in a straw and has fine holes on the surface thereof. Such a hollow fiber membrane is used for obtaining filtrate in which pollutants are removed in a water treatment system. In a water treatment system using a hollow fiber membrane, enhancement of the water treatment efficiency according to the treatment capacity, and extension of the life of the hollow fiber membrane in use are recognized as crucial points for determining the performance of the water treatment system.

Prior to describing the water treatment method using a hollow fiber membrane and an apparatus therefor according to the present invention, the conventional water treatment methods using the hollow fiber membrane will be described below.

There are a dead-end filtration method and a cross-flow filtration method as conventional water treatment methods using hollow fiber membranes.

FIG. 1 is a view showing a conventional water treatment apparatus employing a dead-end filtration method. In the water treatment using the dead-end filtration method, the influent water is passed through a hollow fiber membrane housing 10 and pollutants among the influent water are filtered by a hollow fiber membrane 11 as follows.

The influent water is introduced into the membrane housing 10 via an influent water solenoid valve 15 which is controlled by an electric signal from an original water tank 12 by the power of an influent water pump 14. The filtrate in which pollutants are removed by the hollow fiber membrane 11 are collected into a filtrate water tank 13 by a filtrate water solenoid valve 16.

The above-described water treatment method using the dead-end filtration method performs an air scrubbing or a back-washing using the filtrate water, to remove the pollutants accumulated in the hollow fiber membrane housing 10.

The air scrubbing method introduces the air discharged from an air compressor into the hollow fiber membrane 10 via an air scrubbing solenoid valve 19, while the back-washing method introduces the filtrate, in which pollutants are already removed, into the hollow fiber membrane 10 by a back-washing pump 18, to thereby clean the pollutants attached to the hollow fiber membrane 11.

The pollutants which are removed from the hollow fiber membrane 11 by the cleaning process and accumulated in the hollow fiber membrane housing 10 are discharged by a drain solenoid valve 17 to the outside.

However, the above cleaning process makes the water treatment apparatus complicated. Also, in the above cleaning process, the water treatment method according to the dead-end filtration method quickly increases the quantity of the pollutants accumulated in the hollow fiber membrane to thereby block the hollow fiber membrane causing the life of the hollow fiber membrane to be shortened.

Another conventional water treatment method employing the cross flow filtration method solves the defect of the hollow fiber membrane pores being blocked by the pollutants in the water treatment using the dead-end filtration method. FIG. 2 is a view showing a water treatment apparatus employing a cross flow filtration method.

The cross flow filtration method continues to circulate the water via a circulation solenoid valve 29 to thereby prevent the pollutants from being accumulated in the hollow fiber membrane housing 20. An influent water pump 24, an influent solenoid valve 25, a filtrate solenoid valve 26, a drain electronic valve 27 and a back-washing pump 28 in the cross-flow filtration method are the same as those in the dead-end filtration method in terms of their functions thereof.

As the flow speed of the circulation water increases, the cross flow filtration method reduces the tendency of accumulation of the pollutants in the hollow fiber membrane compared with the dead-end filtration method, resulting in the extension of the life of the hollow fiber membrane. However, to keep the speed of the circulated water flow, much more amount of water should be circulated than the amount of water to be treated by the water treatment apparatus, which causes much energy consumption.

SUMMARY OF THE INVENTION

To solve the above problem, it is an object of the present invention to provide a water treatment method and apparatus using a hollow fiber membrane in which a direction-convertible stirrer is used to remove pollutants accumulated in the hollow fiber membrane to solve the problem of the hollow fiber membrane pores being blocked by the pollutants, thereby extending the life of the hollow fiber membrane.

Another object of the present invention is to provide a water treatment method and apparatus using a hollow fiber membrane in which a direct-suction method is used to provide an effective water treatment method without having unnecessary water flow, to thereby improve the inefficient energy use problem in a cross flow filtration method.

Yet another object of the present invention is to provide a simpler water treatment method and apparatus having no separate piping by mounting a hollow fiber membrane in an influent water tank, compared with a conventional system having a separate piping which runs from an influent water tank to a hollow fiber membrane housing due to the separation of the influent water tank and the hollow fiber membrane housing.

To accomplish the above object of the present invention, there is provided a water treatment method using a hollow fiber membrane, the water treatment method comprising the steps of:

mounting the hollow fiber membrane into an influent water tank;

separating filtrate from the influent water tank by using a suction pump connected with the hollow fiber membrane; and removing pollutants accumulated in the hollow fiber membrane by stirring the influent water in the water tank.

There is also provided a water treatment apparatus using a hollow fiber membrane, the water treatment apparatus comprising:

a influent water tank in which a stirrer for removing pollutants accumulated in a hollow fiber membrane is mounted, in which the hollow fiber membrane is submerged in the influent water tank, for filtering the pollutants from the influent water;

a solenoid valve for controlling filtrate water to be discharged into a filtrate water tank; and a suction pump for sucking the filtrate water from the influent water tank and introducing the sucked water to the filtrate water tank.

BRIEF DESCRIPTION OF THE DRAWINGS

The preferred embodiments are described with reference to the drawings wherein.

DETAILED DESCRIPTION OF THE PREFERRED EMBODIMENT

Figure 1:
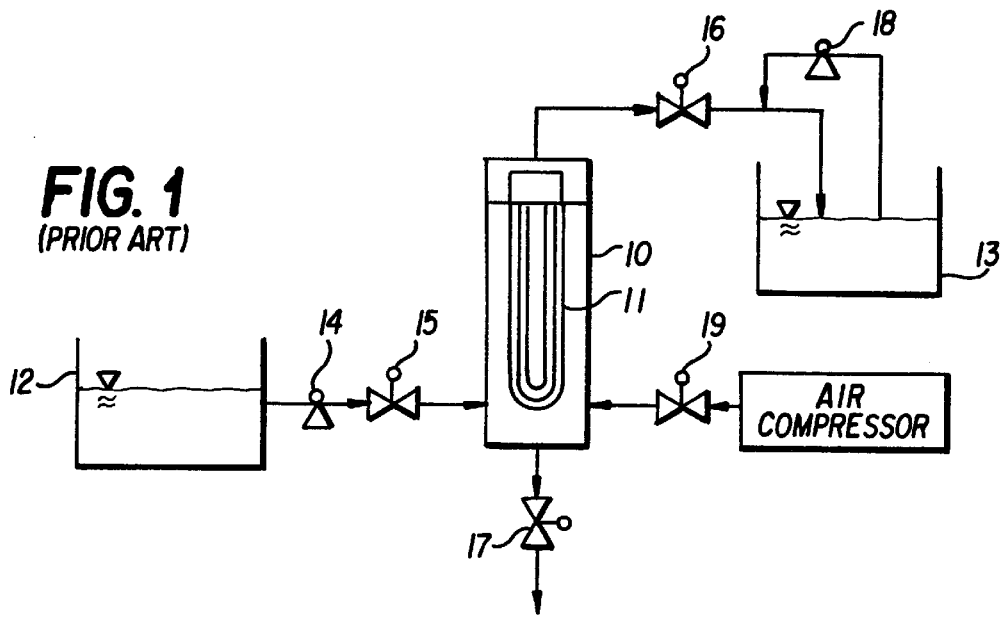
FIG. 1 is a view showing a conventional water treatment apparatus employing a dead-end filtration method.
Figure 2:
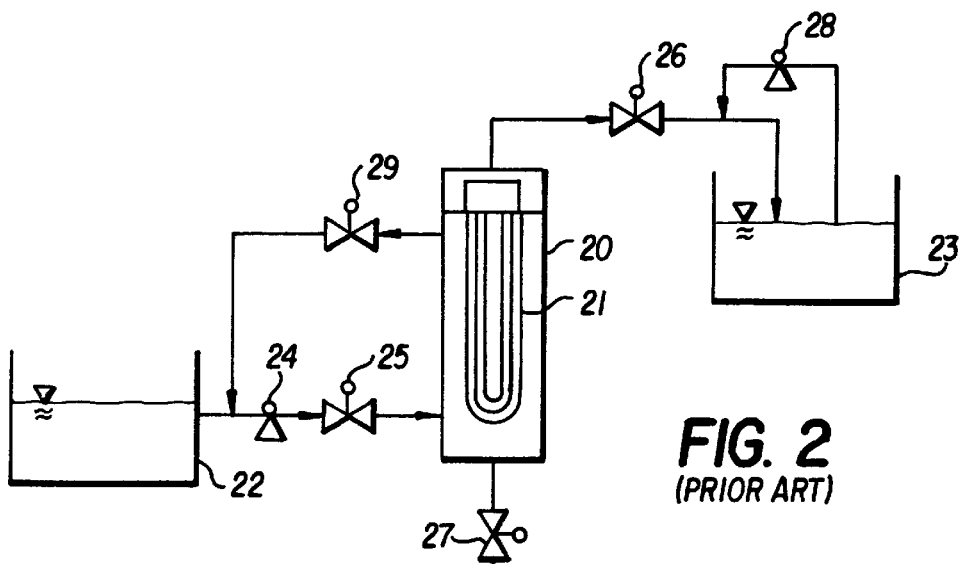
FIG. 2 is a view showing a water treatment apparatus employing a cross flow filtration method.

A water treatment method and apparatus according to a preferred embodiment of the present invention will be described below in more detail with reference to FIG. 3.

A water treatment apparatus employing a direct-suction filtration method according to the present invention includes an influent water tank 30 in which a stirrer 36 for removing pollutants accumulated in a hollow fiber membrane 31 is placed, in which the hollow fiber membrane 31 is submerged in the influent water tank 30, for filtering the pollutants from the influent water, a solenoid valve 32 for controlling filtrate water to be discharged into a filtrate water tank 34 which contains the filtrate, a suction pump 33 for sucking the filtrate water from the influent water tank and introducing the sucked water to the filtrate water tank 34, and a drain solenoid valve 35 for removing the accumulated pollutants.

The water treatment apparatus according to the present invention is characterized in that the hollow fiber membrane 31 is mounted in the influent water tank 30 and the filtrate can be obtained via the hollow fiber membrane 31 from the influent water tank 30 using the direct-suction filtration method by the suction pump 33.

The direct-suction filtration method by the suction pump 33 enables the hollow fiber membrane 31 to effectively filter the pollutants. Also, since the suction pump 33 directly sucks the water from the influent water tank, there is no water flow which is unnecessary. The direct suction filtration method improves the flow of the filtrate in the hollow fiber membrane 31 compared with a pressurized filtration method, to thereby obtain a more amount of the filtrate even with of smaller capacity.

The direction-convertible stirrer 36 mounted in the influent water tank 30 is for removing the pollutants accumulated in the hollow fiber membrane 31. The pollutants attached to the hollow fiber membrane 31 can be removed using the water flow shear and energy of the turbulence which is generated by the rotation of alternate directions of the direction-convertible stirrer 36, to considerably extend the life of the hollow fiber membrane 31.

In particular, the direction-convertible stirrer effectively removes the pollutants as follows compared with a one-directional stirrer.

Using the one-directional stirrer, the flow of the water is formed in only one direction. Accordingly, the portion where the pollutants are removed by the direct flow of the water does not accumulate the pollutants, while the opposing portion where the flow of the water is not impacted, that is, the dead space from which the pollutants are not removed, accumulates the pollutants.

However, using the direction-convertible stirrer, such a dead space on which the follow of the water does not influence is not formed, with a result that any portions of the hollow fiber membrane do not accumulate the pollutants. Also, at the time when the direction of the stirrer is shifted, a large amount of energy of the water flow forms a turbulence, thereby further increasing the detachment of the pollutants.

The pollutants removed from the hollow fiber membrane by the direction-convertible stirrer 36 and accumulated in the influent water tank are separately discharged to the outside via the drain solenoid valve 35.

Figure 3:
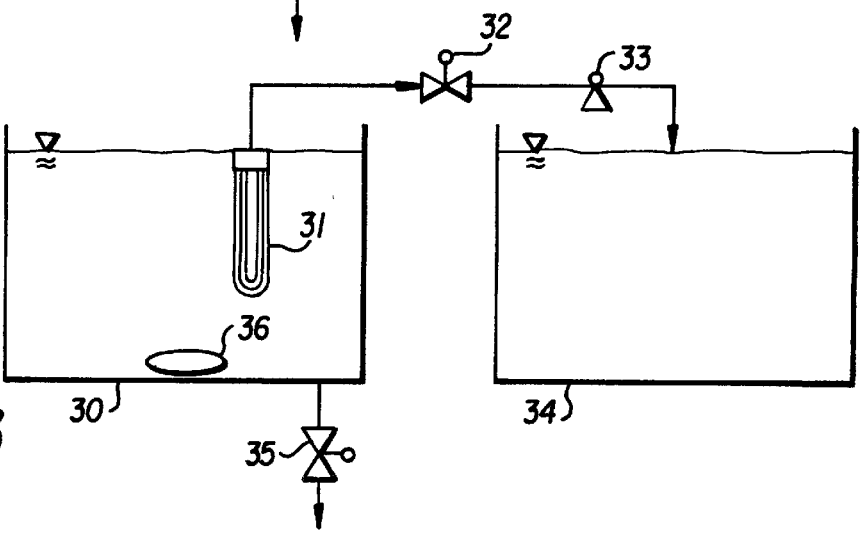
FIG. 3 is a view showing a water treatment apparatus employing a direct-suction filtration method according to the present invention.

As shown in FIG. 3, the water treatment apparatus according to the present invention has the hollow fiber membrane 31 mounted in the influent water tank 30. Thus, an additional pipe line running from the influent water tank to the hollow fiber membrane and an additional pump are not necessary, differently from the prior art, to thereby provide a simpler water treatment apparatus.

Since the water treatment apparatus according to the present invention has a simplified structure and can be packaged in a more compact water treatment apparatus, a user can use a desired number of the water treatment apparatus according to a processing capacity and can easily make a module of the water treatment apparatus according to a processing capacity.

As described above, the water treatment method and apparatus according to the present invention has the hollow fiber membrane mounted in the influent water tank, with a direction-convertible stirrer inside which removed the pollutants accumulated in the hollow fiber membrane to solve the problem of the hollow fiber membrane pore blockage, to thereby extend the life of the hollow fiber membrane. Also, the present invention obtains the filtrate using the direction-suction filtration which does not form an unnecessary flow of the water, to thereby effectively use the energy of the water flow. Also, an additional pipe line running from the influent water tank to the hollow fiber membrane and an additional pump are unnecessary, differently from the prior art, to thereby provide a simpler water treatment apparatus.

While only certain embodiments of the invention have been specifically described herein, it will be apparent that numerous modifications may be made thereto without departing from the spirit and scope of the invention.

What is claimed is:

1. A direction suction water treatment method using a hollow fiber membrane the water treatment method comprising the steps of:

mounting the hollow fiber membrane in an influent water tank;

separating filtrate from the influent water tank by using a suction pump connected with the hollow fiber membrane; and removing pollutants accumulated in the hollow fiber membrane by stirring the influent water in the influent water tank, wherein the stirring process in said pollutants removing step uses a direction-convertible rotary stirrer placed in the influent water tank to stir the water bidirectionally.

2. A water treatment method using a hollow fiber membrane according to claim 1, further comprising the step of discharging the pollutants removed from the hollow fiber membrane and accumulated in the influent water tank according to the pollutants removing step, via a drain solenoid valve to the outside of a water treatment system.

3. A water treatment method using a hollow fiber membrane, according to claim 1, wherein said separated filtrate passes through a solenoid valve which controls flow of said filtrate into a filtrate water tank.

4. A water treatment method of claim 1, wherein said stirrer stirs the water in a first direction and subsequently switches to stirring the water in a second direction and the switching causes turbulence of water in the influent water tank.

5. A direct suction water treatment apparatus using a hollow fiber membrane, comprising:

an influent water tank in which a stirrer for removing pollutants accumulated in the hollow fiber membrane is mounted, in which said hollow fiber membrane housing is submerged in the influent water tank for filtering the pollutants from the influent water;

a solenoid valve for controlling filtrate water to be discharged into a filtrate water tank; and a suction pump for sucking the filtrate water from the influent water tank and introducing the sucked water to the filtrate water tank;

wherein said stirrer mounted in said influent water tank is a direction-convertible rotary stirrer.

6. A water treatment apparatus using a hollow fiber membrane according to claim 5, further comprising a drain solenoid valve for removing the pollutants removed from the hollow fiber membrane and accumulated in the influent water tank.

7. A water treatment apparatus using a hollow fiber membrane according to claim 5, wherein said solenoid valve is a three-way solenoid valve upstream of said suction pump, wherein first and second said ways of said solenoid valve are for passing filtrate therethrough and a third said way of said solenoid valve is for venting to atmosphere.

* * * * *